E. D. PERKINS.
Machine for Reducing the Height of Cheese-Boxes.
No. 215,538.                 Patented May 20, 1879.
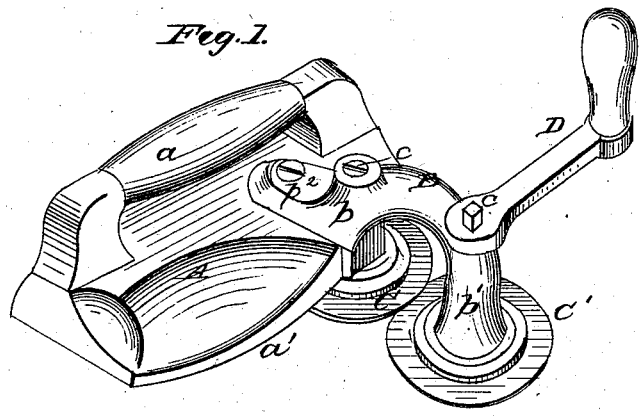
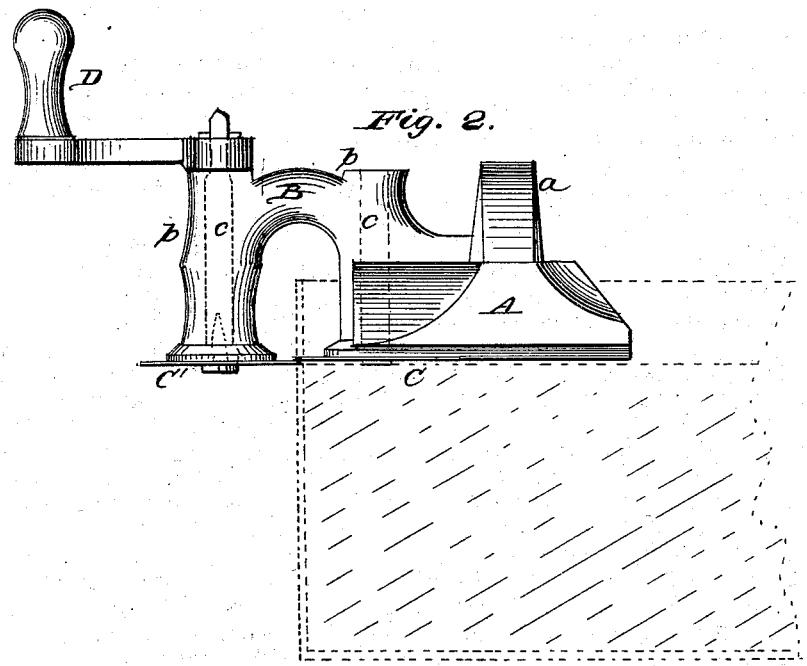

UNITED STATES PATENT OFFICE.

EDWIN D. PERKINS, OF HALLSPORT, NEW YORK.

IMPROVEMENT IN MACHINES FOR REDUCING THE HEIGHT OF CHEESE-BOXES.

Specification forming part of Letters Patent No. 215,538, dated May 20, 1879; application filed October 26, 1878.

*To all whom it may concern:*

Be it known that I, EDWIN D. PERKINS, of Hallsport, in the county of Allegany and State of New York, have invented certain new and useful Improvements in Box-Cutting Machines; and I do hereby declare that the following is a full, clear, and exact description thereof, sufficient to enable others skilled in the art to which my invention appertains to make and use the same, reference being had to the accompanying drawings, and to the letters of reference marked thereon, and in which—

Figure 1 is a perspective view of my improved box-cutter, and Fig. 2 is a side view thereof and of a box containing a cheese in dotted lines.

Corresponding parts in the two figures are denoted by like letters.

This invention appertains particularly to machines for cutting down cheese-boxes to reduce them to the size or height of the contained cheese when it becomes necessary; and it consists in the combination, with a conveniently manipulated or handled support or rest, of two cutters, arranged edge to edge, and hung upon or attached to two shafts working in sleeves connected together and to the rest or support by a bridge or yoke, to one of which shafts is applied a handle or crank, the said cutters being circular in form, and one operated by frictional contact with the other, as hereinafter more fully set forth.

In the drawings, A refers to a support or rest, preferably made from a block, and which in practice is placed upon the cheese whose box it is desired to reduce in height to that of the contained cheese. This rest or block is provided with a bail-shaped handle, $a$, to enable it to be conveniently moved around the inner side of the box while the latter is being reduced or cut.

B is a bridge or yoke, the downwardly-projecting portions of which form sleeves $b\ b^1$, within which are hung two vertical shafts, $c\ c$, having attached or connected to their lower ends circular or disk-shaped cutters C C', arranged edge to edge, with one bearing against the other, and revolved by frictional contact with the other.

To the shaft of one of the cutters is applied a handle or crank, D, for imparting by the hand motion to the cutter, which, in turn, operates or revolves its fellow by frictional contact therewith, as above expressed.

The yoke or bridge B has an arm, $b^2$, by which, with the assistance of a screw or other suitable fastening or fastenings, it may be fastened to the support or block A. This block or support, it will be observed, is also rounded, as at $a'$, or on that side placed next to the box, in order to guide the movement of the block carrying the cutters while performing the operation of cutting down or reducing the box.

The operation is as follows: The block or support A is placed on the cheese whose box it is desired to reduce or cut down even with the top of the cheese with the edge or side of box between the cutters. The handle of the outer cutter is now grasped and turned with one hand, and the handle of the block or support grasped and the block moved along in the direction in which the cutters are cutting, which cutting is performed by the turning of the handle of the outer cutter. This operation being proceeded with until the sides of the box have been circumscribed, the required portion will be taken off, and the height of the box be thus reduced to that of the cheese, accomplishing the result desired.

This device is exceedingly simple, easily constructed, and inexpensive.

Having thus fully described my invention, I claim and desire to secure by Letters Patent of the United States—

The combination, with the handled block or support A, having a rounded edge, $a'$, of the bridge or yoke B, having an arm, $b^2$, connecting it to the block A, and the sleeves $b\ b^1$, and cutters C C', attached to shafts working in the sleeves $b\ b^1$, and supplied with a handle or crank, D, substantially as and for the purpose set forth.

In testimony that I claim the foregoing as my own I hereunto annex my signature in presence of two subscribing witnesses.

EDWIN D. PERKINS.

Witnesses:
 CHARLIE W. BURLINGTON,
 DANIEL P. WITTER.